May 15, 1928. 1,670,025
C. K. DENMAN
EXTENSIBLE RULE
Filed June 22, 1922
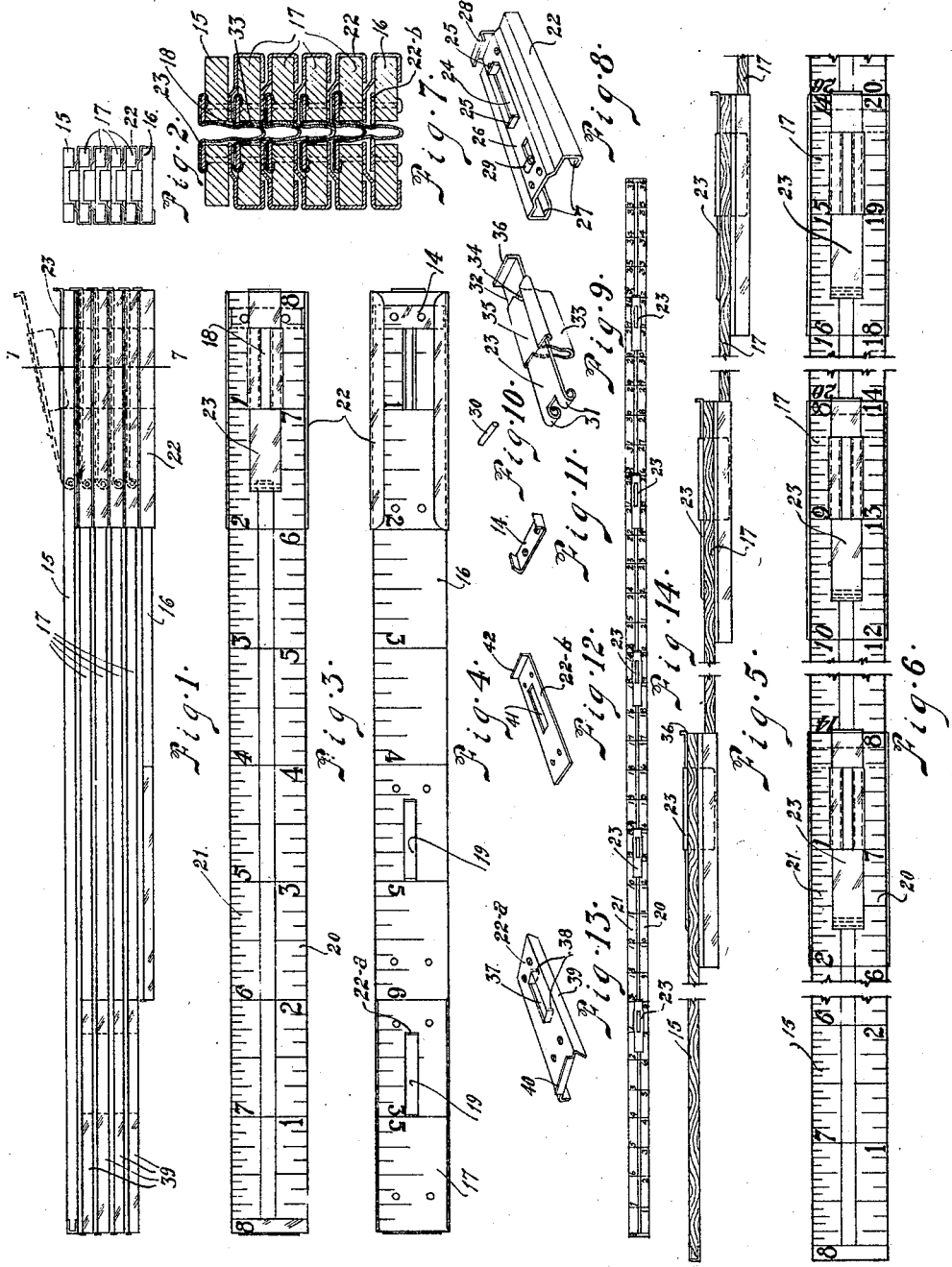
Inventor:
CLIFFORD K. DENMAN.
By Hazard & Miller
Attorneys Patented May 15, 1928.

1,670,025

UNITED STATES PATENT OFFICE.

CLIFFORD K. DENMAN, OF LOS ANGELES, CALIFORNIA.

EXTENSIBLE RULE.

Application filed June 22, 1922. Serial No. 570,054.

My invention relates to extensible rules of that character including a plurality of sections slidably associated with each other so as to permit of their being folded one upon the other and extended in end to end formation, and adapted to be locked in either folded or extended position.

It is a purpose of my invention to provide an extensible rule of the above described character having means for extensibly connecting the rule sections which permits of the use of rule sections of standard thickness and form, and means for securely locking the sections in extended or folded position which operates in such manner as to provide visible means for readily determining whether the sections are in fully extended position, thereby eliminating the possibility of an erroneous reading on the rule as a result of the sections not being in fully extended position.

It is also a purpose of my invention to provide an extensible rule having a scale for procuring inside measurements and a scale for procuring outside measurements, the two scales being on only one side of the rule to eliminate the necessity of turning the rule from one side to the other and the scales having components of different character so as to facilitate the reading of the respective scales and to prevent the confusion of one scale with respect to the other.

Although I will describe only one form of extensible rule embodying my invention and point out the novel features thereof in claims, it is to be understood that various changes and modifications may be made therein without departing from the spirit of the invention and the spirit and scope of the appended claims.

In the accompanying drawings,

Figure 1 is a view showing one form of extensible rule embodying my invention in folded position;

Figure 2 is a view showing in end elevation the rule shown in Figure 1;

Figure 3 is a top plan view of the rule shown in Figure 1;

Figure 4 is a bottom plan view of the rule shown in Figure 1;

Figure 5 is a view showing the rule in side elevation and in fully extended position;

Figure 6 is a top plan view of Figure 5;

Figure 7 is a vertical sectional view taken on the line 7—7 of Figure 1;

Figures 8 to 13, inclusive, are detail perspective views of the parts comprised in the members for extensibly connecting and locking the sections comprised in the rule shown in the preceding views;

Figure 14 is a top plan view of the rule in completely extended position.

Similar reference characters refer to similar parts in each of the several views.

Referring specifically to the drawing, my invention in its present embodiment comprises a plurality of rule sections or measuring sections including an uppermost section 15, a lowermost section 16 and intermediate sections 17, all of the sections being of conventional form in that they are of the standard thickness and contour, particularly with regard to their longitudinal edges. All of the sections are provided at points adjacent their right-hand ends, as viewed in Figures 1 and 3, with slots 18, while adjacent their left-hand ends all of the sections, with the exception of the uppermost section 15, are formed with similar slots 19.

As clearly shown in Figures 3 and 14, the several sections are provided on one side, which in the present instance is the upper side, with a scale designated at 20, for procuring outside measurements, and a second scale designated at 21 for procuring inside measurements. These two scales in the present instance comprise graduations with numerals arranged to designate inches, and as indicated by the shading the figures of one scale are of a different color from those of the other scale so as to prevent confusion of one scale with the other when taking inside or outside measurements. It is to be understood that the graduations themselves may be of different colors or characters so as to provide further means for clearly designating one scale from the other. As illustrated to advantage in Figure 14, the numerals of the scale 20 read consecutively from the top section 15 to the bottom section 16, while the numerals of the scale 21 read consecutively upon each section from the right to the left hand end thereof. It is to be noted, however, that the consecutive reading from, say, the top section 15 continues on the next section beneath from the right hand end to the left hand end. That is to say, eight inches are represented on the top section 15, while on the next section beneath the eighth inch begins at the right hand end of such section and continues up to the fourteenth inch at the left hand end. The remaining sections are merely a continuation of the first two sections in so far as the scale 21 is concerned, and as will be understood by those skilled in the art, accurate inside measurements can be obtained with the characters of the scale arranged as just described.

The sections of the rule are extensibly associated with each other and are adapted to be locked in extended or folded positions by means of connecting or latching members. These connecting members in the present instance comprise socket members 22 and 22$^a$ and head members or latch levers 23. As clearly shown in Figures 1, 2 and 4, the socket members 22 are secured to the under sides of the several sections with the exception of the said bottom section 16 at the right hand end of such sections, each section being formed with a slot 24 which is adapted to register with the slot 18 of the rule section to which the socket member is attached, the ends of the slot 24 being provided with upstanding lugs 25 for positioning the socket member as a unit upon the section. As clearly shown in Figure 8, each socket member is stamped from a single sheet of metal to provide a longitudinally extending raised portion 26 and longitudinally extending channels 27 at the longitudinal edges of the member. A positioning lip 28 is formed on the outer end of the member 22 and this lip is adapted to engage the end of the corresponding section to cooperate with the lugs 25 in securely retaining the socket member in proper position upon the section. A pivot sleeve 29 is also formed in the member 22 and this sleeve is adapted to receive a pivot pin 30 which also extends through ears 31 of a plate 32 constituting a part of one of the head members 23. As clearly shown in Figure 9, each head member also includes a head portion 33 formed of resilient metal in substantially U formation. This head portion 33 is extended through a slot 34 formed in the plate 32, and flanges 35 are formed on the portions 33 so as to engage the longitudinal edges of the plate 32 in securely retaining the head portion in depending relation with respect to the plate. The plate 32 is formed at one end with a stop flange 36, which is positioned so as to limit the sliding movement of that section above the section to which the member is attached.

Each socket member is pivoted so as to occupy locking and non-locking position to secure the several sections in extended or folded position or to permit of their being slid from one position to the other. When in locking position, as shown in Figure 7, the head portions 33 of the several head members are extended through slots 18 and 24 of the sections and socket members, so that the several head portions are nested one with relation to the other and because of their contour they are securely retained within each other to lock the sections against relative movement. To this end, each head portion 33 is what may be termed of double ovate contour in cross section, as clearly shown in Figure 7, so as to receive the nose of an adjacent head portion and so that its nose can be extended into another adjacent head portion. The arrangement of the several head portions with respect to the socket members 22 is clearly illustrated in Figure 7, and as so arranged the several sections are locked in folded position. When the rule sections are in extended position, as shown in Figure 5 and Figure 6, the head portions 33 are adapted to engage within the slots 19 of the sections, and for the purpose of reinforcing the slots 19, the socket members 22$^a$ have been provided. As clearly shown in Figure 13, each socket member 22$^a$ comprises a plate of rectangular form provided with a slot 37 positioned to register with the slot 19 and having lips 38 at the ends thereof for positioning the member upon a section. The socket member is suitably secured to the corresponding rule section at the left hand end thereof, as viewed in Figure 4, and side flanges 39 are formed on the plate of the socket member which engage the edges of the section to protect the latter and also serve to rigidly position the member upon the section. A stop lip 40 is formed on one end of the socket member so as to be disposed at the left hand end of the rule section to thereby engage the corresponding socket member 22 to define the extended position of any two adjacent sections.

It is to be understood that when moving the rule sections from folded position as shown in Figure 1 to extended position as shown in Figure 5, it is necessary first to remove the head portions 33 from the socket members 22. This is accomplished by lifting each head member to the position shown in dash lines in Figure 1, thereby disengaging the corresponding socket member 22 and permitting the respective sections to be slid longitudinally upon the support section. This sliding movement is continued until the two sections are in fully extended position with respect to each other, whereupon the head portion 33 coincides with the slot 19 so that by depressing the head member the head portion can be inserted into the slot so as to engage the socket member 22$^a$. It will be clear that the head member cannot be depressed until the head portion and slot coincide so that if the two sections are not in fully extended position, the raised position of the head member will visibly indicate such condition. The operator can, therefore, readily determine when any two adjacent sections are not in completely extended position so that the possibility of procuring an erroneous reading of either scale 20 or 21 is positively prevented.

It is to be understood that it is not necessary to provide the lowermost section 16 with socket member 22, but in order to provide a restricted slot for the reception of the corresponding head portion 33 a plate 22$^b$ is provided. As clearly shown in Figure 12, this plate is formed with a slot 41 through which the corresponding head portion 33 is adapted to be extended. At one end of the plate a stop lip 42 is formed which functions in the same manner as the lips 28.

For the purpose of reinforcing the socket members 22 when in applied position upon the rule sections, the strips 14 are secured to the under sides of the sections in the manner clearly shown in Figure 4. The detail construction of the strip is shown in Figure 11.

From the foregoing description, taken in conjunction with the accompanying drawings, it will be manifest that the connecting members for the several rule sections are extremely simple and of inexpensive construction and that they operate to effectively secure the rule sections in either folded or extended position.

It will be further noted that the construction of the socket members 22 is such as to eliminate the necessity of modifying in any way the construction of the rule sections the channels 27 slidably embracing the longitudinal edges of the section and at opposite sides of the sections. This obviously eliminates the necessity of channeling the edges of the sections, while at the same time the sections may be made of standard thickness.

Thus I have produced an extensible rule having a plurality of rule sections or measuring sections of substantially equal length, the sections being long enough to overlap when extended, said sections having similar slots in both ends, latching members at corresponding ends of the measuring sections, said latching members comprising sockets fixed upon corresponding ends of the measuring sections, latch levers pivoted to the inner ends of the socket members, so that a measuring section will pass between a socket and a latch lever, and heads carried by the latch levers and adapted to enter the slots in the measuring sections to hold the sections extended or folded and the various other details hereinbefore described.

I claim as my invention:

1. A rule comprising a plurality of sections formed with slots, and means for extensibly connecting the sections and locking the same in extended or folded position comprising socket members secured to the sections and slidably receiving adjacent sections, and head members pivoted on the socket members and capable of being extended through the slots of the subjacent sections to engage the socket members to lock them together.

2. A rule comprising a plurality of sections, and means for extensibly connecting the sections and locking the same in extended or folded position comprising cooperating head and socket members, pivoted to said head members the socket members slidably receiving adjacent sections, and the head members being arranged to engage the socket members of subjacent sections when the sections are in folded or extended position.

3. A rule comprising a plurality of sections, and means for extensibly connecting the sections and locking the same in extended or folded position comprising socket members having slots and secured to the sections and slidably receiving adjacent sections, and head sections pivoted on the socket members to engage or disengage the slots of the socket members of subjacent sections.

4. A rule comprising a plurality of sections, means for extensibly connecting the sections and locking the same in extended or folded positions, said means cooperating with slots formed in said sections, and including socket members secured upon one side of each of said sections and adapted to receive the subjacent section, and hinged head members pivoted to each of said socket members and disposed upon the side thereof opposite said subjacent section, the heads of said head members being adapted to extend through the slots of the socket members to which they are attached and into the slots of the subjacent section.

5. A rule comprising a plurality of sections, means for extensibly connecting the sections and locking the same in extended or folded positions, said means cooperating with slots formed in said sections, and including socket members secured upon one side of each of said sections and adapted to receive the subjacent section, and hinged head members pivoted to each of said socket members upon the side thereof opposite said subjacent section, the heads of said head members being adapted to extend through the slots of the socket members to which they are attached and engage the slots of the subjacent section.

6. A rule comprising a plurality of sections, means for extensibly connecting the sections and locking the same in extended or folded positions, said means cooperating with slots formed in said sections, and including socket members secured upon one side of each of said sections and adapted to receive the subjacent section, and head members pivoted to each of said socket members upon the side thereof opposite said subjacent section, the heads of said head members being adapted to extend through the slots of the socket members to which they are attached and engage the slot of the subjacent section, and abutments carried by said head members for limiting the movement of the next upper section in one direction.

7. In an extensible rule, a first and second rule sections, both sections having slots near their adjacent ends and means for extensibly connecting the adjacent ends of the sections together, said means comprising a socket member slidingly mounted upon the first section and having a slot adapted to register with the slot in the section, said socket member having upturned lugs to locate the member upon the second section, a pivot sleeve formed transversely upon the socket member, a head member having ears to embrace the sleeve, a pivot pin connecting the parts together, the head portion being adapted to extend through the slots so that when the head member is elevated, the sections may slide relative to each other and when the head member is lowered into the slots, the sections are securely held folded or extended.

8. An extensible rule comprising a plurality of sections slidable one upon the other, means associated with each section for maintaining an adjacent section in sliding relation with respect to it, there being apertures formed in each of said sections, and a locking member on each section adapted to be extended through the aperture in the section on which it is mounted and into an adjacent section for locking the sections in extended or collapsed position, said locking members providing a visible indicator for indicating when the sections are in fully extended or fully collapsed position.

9. A rule comprising a plurality of measuring sections formed with corresponding slots in each end, socket members fixed upon corresponding ends of the measuring sections, head members pivoted to the socket members, heads carried by the head members and adapted to enter the slots to hold the measuring sections in folded or unfolded positions.

10. A rule comprising a plurality of measuring sections formed with corresponding slots in each end, socket members fixed upon corresponding ends of the measuring sections, head members pivoted to the socket members, and heads carried by the head members and adapted to enter the slots to hold the measuring sections in folded or unfolded position, the measuring sections being between the socket members and the head members.

In testimony whereof I have signed my name to this specification.

CLIFFORD K. DENMAN.